Patented Aug. 29, 1944

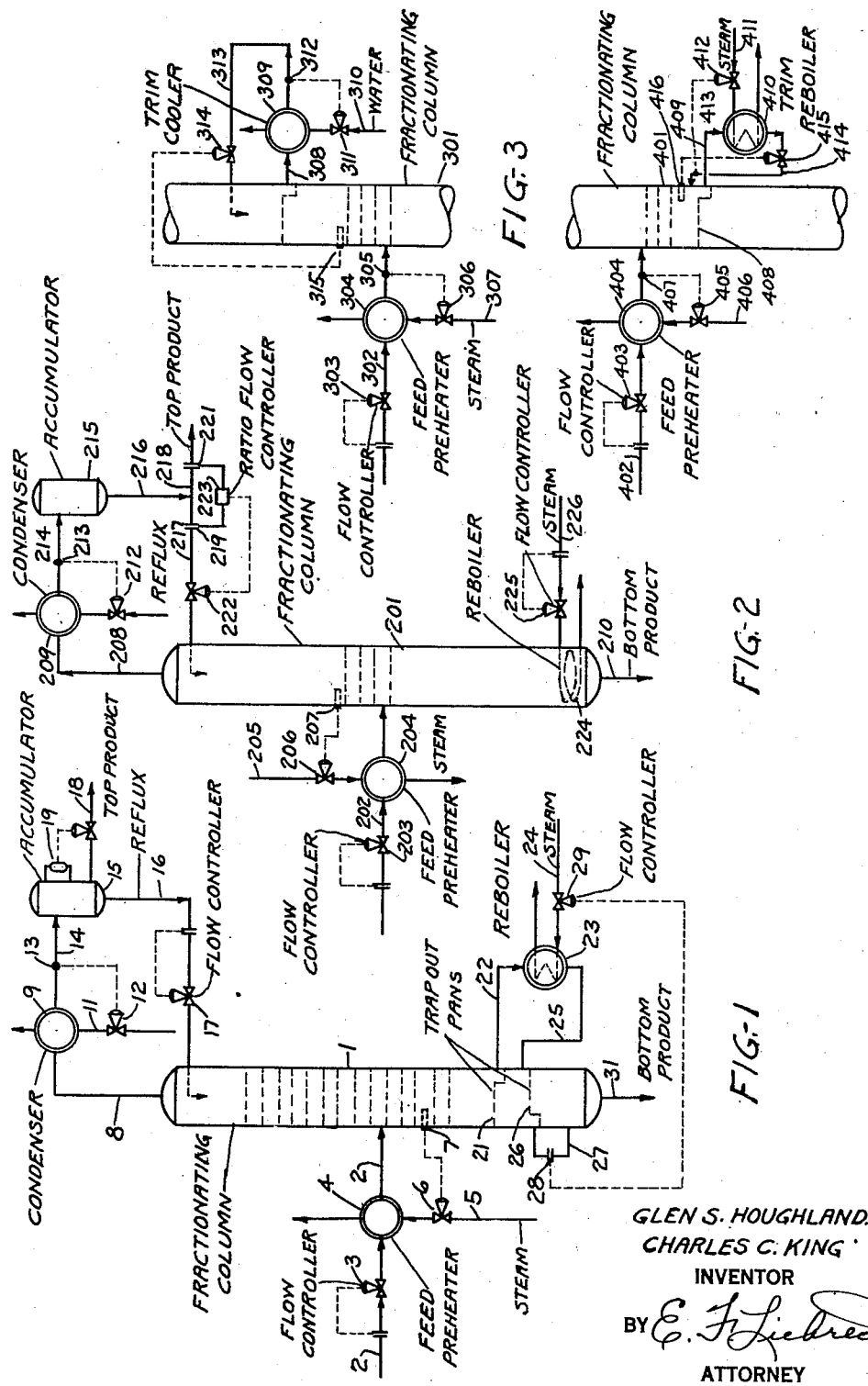

2,357,113

UNITED STATES PATENT OFFICE 2,357,113

APPARATUS FOR DISTILLATION CONTROL

Glen S. Houghland, New York, N. Y., and Charles C. King, Roselle, N. J., assignors to The M. W. Kellogg Company, Jersey City, N. J., a corporation of Delaware Application November 30, 1940, Serial No. 368,022

7 Claims. (Cl. 196—132)

This invention relates to fractional distillation, and particularly to a method of controlling the operation of a fractionating column.

Distillation control is primarily a matter of regulating the rate at which heat is supplied to the materials undergoing fractionation. The heat requirements of a fractional distilling operation are fixed for the most part by the composition of the mixture to be fractionated, and the degree of fractionation desired. It is rare in distillation practice to encounter a feed of absolutely unvarying composition, and distillation control must therefore provide for constant readjustment of heat input as changes in feed composition occur. In precise fractionation, however, involving almost complete separation of two close-boiling substances, even relatively large changes in feed composition necessitate relatively small changes in total heat input; and yet if these small changes are not made, and promptly, relatively large changes in the composition of the products will take place.

One of the objects of our invention is to provide an improved method of precisely regulating the addition of heat to a fractional distillation operation.

Another object of our invention is to afford a method of distillation control which will facilitate the separation of close-boiling components of a mixture with a high degree of selectivity.

In order to achieve the foregoing objects, we first establish a constant ratio of liquid downflow to rising vapor in either the upper or lower section of the column to be controlled, considering the feed inlet as the dividing point between the two sections. The particular section chosen for this step is determined in accordance with considerations hereinafter to be discussed. In the event that the upper section is chosen, we maintain a constant liquid to vapor ratio (reflux ratio) by varying the reflux duty, and maintain a heat input at the base of the column through the reboiler which is proportioned to the feed rate. If, on the other hand, ratio control in the bottom section is chosen, we vary the rate at which heat is supplied to the reboiler (and hence the vaporization produced thereby), while holding the reflux duty at the top of the column proportional to the feed rate.

The particular liquid-to-vapor ratio employed in any given instance need not be chosen with care, providing it is in a range consistent with the degree of selectivity required of the fractionating operation. Whatever the ratio chosen, however, it must remain constant.

Having established a constant liquid-to-vapor ratio in one section of a column, we then provide for measurement of the temperature at a point in that section which is a short distance from the feed inlet, preferably not less than 2 or more than 5 bubble trays. Remaining steps of our method are directed to the maintenance of constant temperature at the measuring point, and to that end we supply to the column, at or closely adjacent the feed inlet, a net amount of heat which is regulated in accordance with the measured temperature. Specifically, we prefer to vary the amount of heat entering the column in the feed itself. If desired, however, this may be held constant and small amounts of heat added to or withdrawn from the column at a point near the feed inlet by means of auxiliary heating or cooling surface contacting either the liquid or vapor traversing the column.

Although other explanations can be given, we prefer to account for the efficacy of our method as follows:

The heat requirements of a distilling column can be satisfied roughly either by proportioning the reflux to the overhead product and proportioning the reboiler heat duty to the feed rate, or by proportioning the reboiler duty to the quantity of bottoms product withdrawn and proportioning the reflux duty to the feed rate. Both procedures establish a zone of constant liquid-to-vapor ratio in the column, and when this ratio is constant in either section of the column, there is a fixed relationship between the composition of the product withdrawn from that section (in terms of freedom from material desired in the other product) and the temperature at any point in the section. If the temperature at any point is held constant, there will be no variation in the purity of the product withdrawn assuming no variation in feed composition.

In the event that a change in feed composition occurs, necessitating an alteration in the rate of heat input to the column, it is, of course, essential to have some indication that the alteration is demanded before it can be performed. A change in temperature at any point in the column gives such an indication. We have found that the greatest temperature change per unit change in heat demand occurs at a point located a few trays away from the feed inlet, and hence that the temperature at that point is the most sensitive index. In one instance, for example, a given departure from the ideal rate of heat input produced a change of 3° F. at a point three trays below the feed inlet, while at the bottom of the column the change was only half a degree. Altered heat demand will be detected more quickly if temperature changes are observed at a point a few trays from the feed inlet, than if they are observed at any other point.

By regulating the net heat input to the tower by means of "trimming" heat added or withdrawn in close proximity to the point of entry of the feed, we are able to correct the net heat input rate before improper conditions have spread through the column. There is, as it were, no lost motion between the demand of the feed for more or less heat, and the effective response of our control system to that demand.

In the precise fractional distillation of a mixture, an attempt is usually made to separate substantially completely, two components of the mixture having adjacent boiling points, one comprising the highest boiling constituent desired in the top product and the other the lowest boiling constituent desired in the bottom product. These two adjacent components are referred to as "key" components. All materials boiling above the heavier key component go to make up the bottom product, while all materials boiling below the lighter key component go to make up the top product. In some instances, of course, the key components are the only components, as in the separation of a binary mixture. More commonly, multi-component mixtures are encountered. Changes in the composition of multi-component feeds may be of two kinds, viz. (1) changes in the per cent of the feed classifiable as top or bottom product, and (2) changes in the relative proportions of the materials going to make up the individual products. Changes of the second kind usually occur only with respect to one of the products. The statement previously made, that under constant liquid-vapor ratio conditions in one section of a column a fixed relationship exists between product purity and temperature, is true only so long as feed composition changes of the second kind do not occur with respect to the product being withdrawn from that section of the column wherein the constant ratio is being maintained. Since at least one product will almost always be unaffected by such changes, we establish a constant ratio in that section of a column from which the unaffected product is to be withdrawn. It is to be understood, however, that even when both products are affected by changes in the proportions of the materials of which they consist, the essentials of our method are of utility. In such an event our method may be supplemented by auxiliary control, either manual or instrumental, and will afford the same increased facility compared to existing control methods, as it does in the more common instances.

A more detailed description of our invention in one of its preferred forms will now be given with reference to the annexed drawing, wherein:

Fig. 1 is a diagrammatic elevation of a distillation column provided with apparatus suitable for the practice of our invention when ratio control in the lower section of a column is contemplated, and Fig. 2 is the counterpart of Fig. 1 for the case of ratio control in the upper section of a column, and Fig. 3 is a fragmentary view of a portion of the column shown in Fig. 2 including an alternative means of regulating heat input to the mid-portion thereof, and Fig. 4 is a fragmentary view of the column shown in Fig. 1 including an alternative means of regulating heat input to the mid-portion thereof.

All the figures include means for making the application of our method to a column automatic. It is to be understood, of course, that manual operation can be substituted if desired.

The apparatus shown in Fig. 1 consists of a fractionating column 1 of more or less conventional design, having a feed inlet line 2 provided with a flow controller 3. Interposed across the feed line is a feed preheater 4 in the form of a heat exchanger, through which is passed any suitable heating medium, such as high pressure steam, via a line 5. The flow of heating medium is controlled by a diaphragm valve 6, which is in turn positioned in accordance with the impulse supplied by a temperature-responsive element 7 located within the column 1 at a point three trays below the feed inlet.

The top of the column is provided with a vapor outlet line 8 which leads to a water-cooled condenser 9, flow through the water-supply line 11 being subject to control by a diaphragm valve 12 positioned in accordance with the indications of a temperature-responsive element 13, located in a line 14 leading condensate away from the condenser. This arrangement may be used to hold a constant temperature at the condenser outlet by varying the cooling done by the condenser.

Condensate passes through line 14 to an accumulator 15, from the bottom of which a reflux line 16 returns to the top of the column. This reflux line is equipped with a constant flow controller 17.

Condensate produced in excess of reflux requirements, constituting the overhead product, is withdrawn, as it accumulates, through the product line 18, the rate of withdrawal being set by a liquid level controller 19.

The lower section of the column contains a trap out pan 21 which collects all liquid flowing downwardly therethrough, the said liquid being withdrawn through a line 22 and passed to a reboiler 23 heated by any suitable medium, for example steam, which medium is supplied through line 24.

Liquid which has traversed the reboiler is returned through a line 25 to a point below the trap out pan and is held on a second trap out pan 26 while disengagement of vapors, formed as a result of the heat supplied in the reboiler, takes place. The remaining liquid is withdrawn from the second trap out pan through line 27 and passed to the base of the column, traversing enroute a flow measuring instrument 28 which positions a valve 29 located in the heat medium supply line 24 leading to the reboiler. A bottoms product draw-off line 31 is connected to the base of the column.

To facilitate further explanation of our method with reference to the apparatus described, it will be assumed that a feed stock consisting of hexane, pentane, normal and iso-butane, and propane is to be separated into two cuts, one including substantially all the normal butane and heavier components, and the other including substantially all the iso-butane and propane. The only variation in the composition of this feed stock likely to occur is a change in the percentage of propane which it contains. At one extreme, 100 mols. of the normal-butane-andheavier fraction may be accompanied by 20 mols. of iso-butane and 10 mols. of propane, while at the other extreme there are 20 mols. of iso-butane and 20 mols. of propane. There is no change in the relative proportions of the hexane, pentane and normal butane comprising the bottoms fraction, but the per cent propane in the top product may vary from 33⅓% to 50%. Concomitant to the latter variation, the yield of top product will vary from 23% (30÷130) to 28.6% (40÷140), and the bottoms yield will vary from 77% to 71.4%.

Under these circumstances, and proceeding in accordance with the feature of our method previously explained, we must establish a constant liquid to vapor ratio in that section of the column from which the product of unvarying composition is to be withdrawn—that is, the bottom section.

The column is initially placed in operation by admitting the feed through line 2 at a constant rate, fixed by the setting of the controller 3. By manual adjustment of the reflux flow controller 17 and the reboiler heat medium flow controller 29, the tower is brought as close to the desired operating conditions as practicable, with the feed preheat exchanger 4 supplying an amount of heat midway of its capacity. A suitable liquid-to-vapor ratio having been established in the lower section of the column, the flow controller 29 is coupled to the orifice 28 in line 27 to hold that ratio. Constant reflux duty at the top of the column is assured by holding the temperature of the condensate constant, and fixing the rate at which reflux is supplied through line 16. Condensate temperature is fixed by the control valve 12 on the water line, piloted by the temperature-responsive element 13 located in the condenser outlet line 14. It will be noted that although the ratio of total liquid downflow to rising vapor is sought to be controlled in the lower section, the arrangement of instruments is such as to maintain the product draw-off-to-vapor ratio constant. Since the total liquid downflow (L) is equal to the sum of the reboiler vapor (V) and the bottoms product (B), it will be apparent that to fix B/V is to fix L/V also, L/V being equal to $$\frac{B+V}{V}$$

There is a distinct advantage, moreover, in locating the flow-responsive orifice 28 in line 27 so as to measure B rather than in line 22 so as to measure L; assuming B equal to 1 and V equal to 5, for example, a unit change in B will alter B/V by 50%, whereas L/V will be altered only 16%. The use of B/V as an index to L/V thus provides added sensitivity of control.

The rate of withdrawal of bottom product is measured in line 27 rather than in line 31 so as to avoid the time lag which would be introduced by the body of bottoms product held in the base of the column. It is usually desirable to maintain such a body in the base of a column, but if this is not desired then the second trap out pan may be dispensed with and the orifice 28 may be inserted in line 31.

Having placed the column in rough balance as above described, we next couple the feed preheating medium control valve 6 to the temperature-responsive device 7 and by repeated observations of product quality we successively adjust the response of valve 6 until the desired product specifications are met. The column will now be under full automatic control.

In the event that an increase in the amount of propane in the feed stock occurs, the temperature will begin to drop in the midsection of the tower, due to the fact there is not sufficient heat being supplied to vaporize the increased amount of propane. As soon as this temperature drop is detected by the temperature-responsive element 7, it will call for more feed preheat and open the valve 6 on the heating medium supply line. This additional heat will suffice to vaporize the increased amount of propane in the feed, and will offset the accompanying tendency for iso-butane to be liquefied and carried downwardly.

An increased amount of propane means an increased amount of top product, hence a decreased amount of bottom product. As soon as this decrease is detected by the orifice 28 it will call for a reduction in reboiler heat and will decrease the opening of valve 29 in the reboiler heat medium supply line. This will be in order, as less heat will be required to insure thorough removal of light materials from a reduced amount of bottoms.

In the event that it is desired to change the feed rate, a new adjustment of the reflux rate will be necessary; this readjustment need not be extremely precise, as the feed preheater and reboiler controls will automatically compensate for minor errors in rebalancing the heat requirements at the new feed rate. It will be understood also that regulation of the heat entering the column in the feed may be achieved by supplying the feed at a higher temperature than necessary and then passing it through a cooler, in lieu of the preheater shown in Fig. 1, the amount of cooling being subject to the demand of the temperature-responsive element within the column.

If the feed stock assumed in the preceding example had contained an unvarying percentage of propane but was subject to variations in hexane content, then the apparatus shown in Fig. 2 would have been chosen, pursuant to the previously discussed method of selecting a proper zone for the establishment of constant liquid to vapor ratio. The manner in which our control method is to be applied in such a case may by analogy be readily understood from the explanation given with reference to Fig. 1.

The column 201 in Fig. 2 is conventional as in Fig. 1 and has a bottom product drawoff line 210, a feed inlet line 202 equipped with preheater 204 and constant feed rate controller 203, and a temperature control element 207 and valve 205 in the preheater heat medium line 205. An overhead vapor drawoff line 208 leads to a condenser 209 having an instrument 213 connected to water control valve 212 for holding constant outlet temperature in line 214, which line leads to an accumulator 215. A draw-off line 216 from the accumulator divides into a reflux return line 217 and a product disposal line 218. Orifices 219 and 221 in the latter two lines operate a valve 222 in line 217 through a ratio flow controller 223 which proportions the reflux supply to the production of top product. This arrangement affords more sensitive control of L/V in the upper section of the tower than would be the case if the total condensate flow rate, corresponding to V, were the measured variable. In other words, the ratio of L (the reflux) to the top product (T) is more sensitive to changes in top product production than to total vapor overhead (V), V being equal to $L+T$ and hence $$\frac{L}{V}$$

being equal to $$\frac{L}{L+T}$$

By controlling L/T we control L/L+T or L/V.

In Fig. 2 the supply of heat medium to the reboiler 224 is held constant by a flow controller 225 in the steam supply line 226. It is assumed in this and all other examples that all heat media are available at a constant temperature. Such not being the case, we would provide temperature-responsive instruments located in the heat media supply lines for resetting the heat media flow controllers as temperature changes occurred, so that the heat liberated by the media would not vary.

In Fig. 2 the temperature-responsive element 207 is located three trays above the feed inlet so as to be in the column section wherein liquid-to-vapor ratio is held constant. Establishment of proper conditions is as was described with reference to Fig. 1 and subsequent operation of our control method is likewise analogous. The ratio flow controller in Fig. 2 plays the part of the reboiler controller in Fig. 1, and the reboiler controller in Fig. 2 plays the part of the reflux controller in Fig. 1. The role of the feed preheater is the same in both figures.

In place of feed preheat variations we may supply the feed at a constant temperature and modulate the net heat input to the midsection of the column by other means as exemplified by Figs. 3 and 4. Fig. 3 presents the midsection of a column 301 including a feed inlet line 302 having a flow controller 303, a feed preheater 304, and a temperature-responsive element 305 in the heated feed stream traversing line 302 which actuates a valve 306 in the feed preheating medium supply line 307.

From a tray closely adjacent the feed inlet we withdraw a stream of liquid through line 308 and pass it through a trimming cooler 309, the water supply line 310 of which is provided with a control valve 311 positioned by a temperature-responsive element 312. The latter instrument holds a constant lowered temperature in the liquid leaving the cooler via line 313. This line leads back to column at a point above that from which the cooled liquid was withdrawn, flow through the said line being controlled by a valve 314, which is in turn positioned by a temperature-responsive element 315 situated within the column at the requisite point, three trays distant from the feed inlet. The operation of this arrangement of apparatus and instruments will be apparent, it performs the same regulation of heat input at the column midsection as was achieved by means of the arrangements shown in Fig. 2.

Still another alternate to feed preheat control is shown in Fig. 4, wherein the midsection of a column 401 is provided with feed inlet line 402, feed flow controller 403, preheater 404, preheating medium flow control valve 405 on heat medium supply line 406 holding constant feed inlet temperature through the temperature-responsive element 407 in line 402. Liquid is withdrawn from a tray 408 located a short distance below the feed inlet and passed via line 409 to a trimming reboiler 410, which is supplied with stream through a line 411. The latter line has a valve 412 which is positioned by a temperature responsive device 413, located in line 414 leading heated liquid back to the tower, so as to heat the liquid to a constant higher temperature. Line 414 has a valve 415 which is positioned by a temperature-responsive element 416 located three trays below the feed inlet.

The manner of operation of the arrangement shown in Fig. 4 differs from that of Fig. 3 in that the feed is supplied at a temperature somewhat lower and modulations of the net heat input are obtained by varying the trim reboiler heat. Otherwise the effect of the Fig. 4 arrangement is like that of Figure 1.

The "net heat supplied to the midsection" of a column and the "net heat input to that portion of the column adjacent the feed inlet, including the heat entering the column in the feed" as referred to herein and in the appended claims is defined as the net amount of heat supplied to the mid- or feed-section of the column from the exterior of the column, and does not take into account the varying amounts of heat which may enter and leave that section via the adjacent sections lying above and below, as sensible heat of the vapors and liquids traversing the column.

It is to be understood that the omission from the drawing of pumps for moving streams of liquid is for the sake of greater simplicity; their use wherever necessary will be obvious to those skilled in the art.

Our invention is not limited by any of the exemplary illustrations shown or described as other arrangements of apparatus embodying the invention may be devised.

We claim:

1. The combination with a fractionating column having means associated with the top and bottom thereof for condensing distillate vapors and vaporizing bottoms liquid respectively, each of said means being adapted to permit the return of the changed fluid phase produced by it to the adjacent end of the column, of a flow controller for holding a constant column feed rate, means responsive to the rate at which fluid is being withdrawn from one of the ends of said column for automatically varying the rate of return of changed fluid phase to said end in direct proportion to said rate of withdrawal, temperature-measuring means situated in said column between said end and the feed inlet and relatively close to said feed inlet, and means coupled and responsive to said temperature-measuring means for automatically varying the net heat input to the mid-section of the column to rapidly compensate for temperature variations in said column.

2. A combination as in claim 1 which comprises a feed preheater and wherein said means for varying said net heat input consists of a feed temperature controller associated with said feed preheater.

3. A combination as in claim 1 which comprises means for adjusting the temperature of the column feed to a constant value and a trim reboiler situated adjacent the feed inlet, said means for varying said net heat input consisting of means for regulating the amount of heat supplied to the column by the trim reboiler.

4. A combination as in claim 1 which comprises means for adjusting the temperature of the column feed to a constant value and a trim cooler situated adjacent the feed inlet, said means for varying said net heat input consisting of means for regulating the amount of heat abstracted from the column by the trim cooler.

5. The combination with a fractionating column having reboiling and refluxing means associated therewith of a flow controller for maintaining the feed rate to the column at a constant value, means responsive to the rate of overhead product production for automatically varying the rate of return of reflux condensate to said column in direct proportion to said rate of production, temperature-measuring means situated in said column above the feed inlet thereto and relatively close thereto, and means coupled and responsive to said temperature-measuring means for automatically varying the net rate of heat input to the mid-section of the column to rapidly compensate for temperature variations in said column.

6. A combination as in claim 5 which comprises a feed preheater and wherein said means for varying said net heat input consists of a feed temperature controller associated with said feed preheater.

7. The combination with a fractionating column having a feed preheater and a reboiler of means for measuring the rate at which the bottom product of the tower is being produced and means for automatically varying the supply of heating medium to the reboiler in proportion to said measured rate, means for measuring the temperature at a point in said column lying between the feed inlet and said reboiler and relatively close to said feed inlet, and means for automatically varying the supply of heating medium to said feed preheater in proportion to said measured temperature to rapidly compensate for temperature variations in said column.

GLEN S. HOUGHLAND.
CHARLES C. KING.